(12) United States Patent
Ashikhmin et al.

(10) Patent No.: US 9,301,313 B2
(45) Date of Patent: Mar. 29, 2016

(54) METHOD AND APPARATUS FOR DATA TRANSMISSION WITH USER SELECTION

(75) Inventors: Alexei Ashikhmin, Morristown, NJ (US); Philip A. Whiting, Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 807 days.

(21) Appl. No.: 13/159,158

(22) Filed: Jun. 13, 2011

(65) Prior Publication Data

US 2012/0314735 A1 Dec. 13, 2012

(51) Int. Cl.
*H04H 20/71* (2008.01)
*H04W 72/12* (2009.01)
*H04W 8/28* (2009.01)
*H04W 74/04* (2009.01)

(52) U.S. Cl.
CPC .............. *H04W 72/121* (2013.01); *H04W 8/28* (2013.01); *H04W 74/04* (2013.01)

(58) Field of Classification Search
CPC ... H04W 72/00; H04W 75/002; H04W 72/04; H04W 72/12; H04W 72/121
See application file for complete search history.

(56) References Cited

U.S. PATENT DOCUMENTS

| | | | |
|---|---|---|---|
| 7,230,928 B2 * | 6/2007 | Katz et al. ...................... | 370/252 |
| 7,522,657 B2 * | 4/2009 | Ahmed et al. ................ | 375/219 |
| 8,121,145 B2 * | 2/2012 | Hafeez et al. ................. | 370/461 |
| 8,392,345 B2 * | 3/2013 | Phillips ........................... | 706/15 |
| 2002/0075799 A1 * | 6/2002 | Bennett ......................... | 370/229 |
| 2010/0202418 A1 * | 8/2010 | Barrett ........................... | 370/336 |
| 2010/0316163 A1 * | 12/2010 | Forenza et al. ............... | 375/296 |
| 2012/0069824 A1 * | 3/2012 | Papadopoulos et al. ...... | 370/336 |
| 2013/0203426 A1 * | 8/2013 | Harnay .......................... | 455/450 |

OTHER PUBLICATIONS

S. ten Brink, G. Kramer, A. Ashikhmin, "Design of Low-Density Parity-Check Codes for Modulation and Detection," IEEE Transactions on Comm. vol. 52, No. 4, 2004, pp. 670-678.

* cited by examiner

*Primary Examiner* — Mounir Moutaouakil
(74) *Attorney, Agent, or Firm* — Mendelsohn Dunleavy, P.C.; Yuri Gruzdkov

(57) ABSTRACT

Various methods and devices are provided to address the need for improved data transmission with coherence interval user selection. In one method, a transmit group to which to transmit during a first coherence time interval is selected. The transmit group is selected (101) from a plurality of users for which there is data to transmit during the first coherence time interval. The data associated with users in the transmit group is transmitted (102) to the transmit group during the first coherence time interval. Subsequent transmit groups to which to transmit during subsequent coherence time intervals are also selected (103). A user of the plurality of users is selected for transmission over the course of the first coherence time interval and the subsequent coherence time intervals with a predetermined probability.

19 Claims, 2 Drawing Sheets

METHOD AND APPARATUS FOR DATA TRANSMISSION WITH USER SELECTION

FIELD OF THE INVENTION

The present invention relates generally to communications and, in particular, to data transmission in communication systems with user selection.

BACKGROUND OF THE INVENTION

This section introduces aspects that may help facilitate a better understanding of the invention. Accordingly, the statements of this section are to be read in this light and are not to be understood as admissions about what is prior art or what is not prior art.

Consider the following scenario. A base station (BS) is equipped with M (typically from 4 to 20) antennas and should transmit data to K (typically from 10 to 40) users. Wireless base stations with many antennas are a strong candidate for future generations of wireless networks, offering very significant increases in data rates. One possible implementation of such systems can be obtained by configuring several light radios (small basic radio with a single antenna) together.

The wireless channels between the BS and K users stay approximately constant during coherence intervals of length T seconds (typically T is about half a millisecond). The channel between the BS and a user changes significantly from one coherence interval to the next. Such changes take place about 2000 times/sec. Therefore, the channel between the BS and a user could have very high throughput during coherence interval 1 and very bad throughput during coherence interval 2.

In the beginning of each coherence interval, the BS chooses a new subset of L users whose channels have the highest throughputs. The BS then transmits data only to those L users. This approach allows one to maximize the system throughput.

The problem, however, is how to inform each user whether it was selected or not for data transmission in a particular coherence interval. One known solution is to send to each user a dedicated signal indicating whether the user is selected or not. This solution has at least two substantial issues though.

1. The dedicated signals should be transmitted to the users very reliably. Otherwise, an unselected user can assume that data is being transmitted to it during a particular coherence interval. As a result, packet synchronization can be lost, which leads to serious service degradation. The opposite possibility can also occur—a selected user fails to receive a packet when it should. To avoid these problems the selection error probability should be of the order of 10^(−7). This means that dedicated signals must have long duration to be received reliably.

2. Since the coherence intervals are short, transmission of these dedicated signals occupies almost the entire coherence interval. This means significant system throughput degradation.

Thus, new solutions and techniques that are able to address some of the issues with coherence interval user selection would meet a need and advance wireless communications generally.

Figure 1:
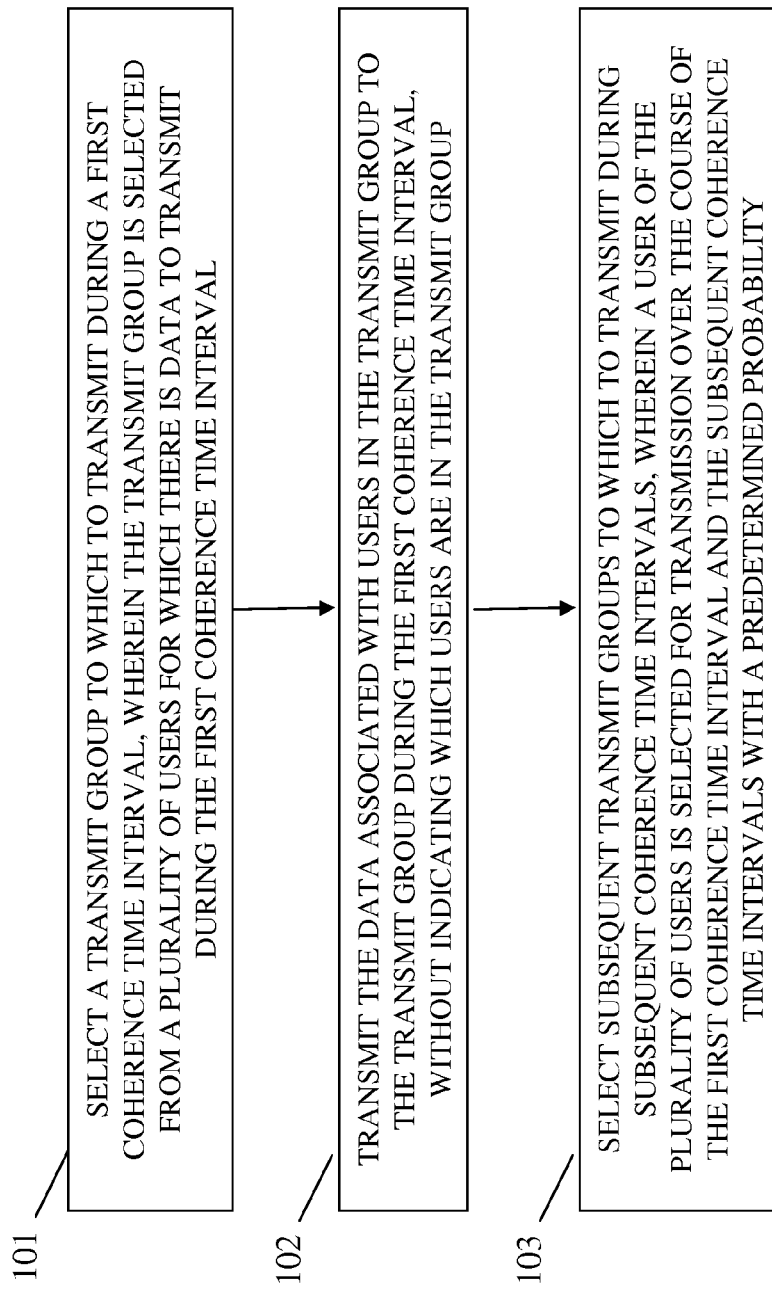
FIG. 1 is a logic flow diagram of functionality performed in accordance with various embodiments of the present invention.

Specific embodiments of the present invention are disclosed below with reference to FIGS. 1-2. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for improved data transmission with coherence interval user selection. In a first method, a transmit group, to which to transmit, during a first coherence time interval is selected. The transmit group is selected from a plurality of users for which there is data to transmit during the first coherence time interval. The data associated with users in the transmit group is transmitted to the transmit group during the first coherence time interval. Subsequent transmit groups to which to transmit during subsequent coherence time intervals are also selected. A user of the plurality of users is selected for transmission over the course of the first coherence time interval and the subsequent coherence time intervals with a predetermined probability (as will be explained subsequently). An article of manufacture is also provided, the article comprising a processor-readable storage medium storing one or more software programs which when executed by one or more processors performs the steps of this method.

Many embodiments are provided in which the method above is modified. For example, in many embodiments transmitting the data associated with users in the transmit group during the first coherence time interval includes transmitting the data without indicating to the plurality of users which users are in the transmit group. In many embodiments, transmitting the data associated with users in the transmit group during the first coherence time interval includes transmitting at least one symbol to each user in the transmit group during the first coherence time interval. In many embodiments, the method also includes discarding the data associated with users not in the transmit group but for transmission during the first coherence time interval. The method may also include utilizing error correcting coding to protect data to be transmitted to the plurality of users. Furthermore, utilizing error correcting coding may involve using the predetermined probability of selecting the user for transmission to protect data to be transmitted to the user.

In a second method, a user device receives signaling from a transceiver node during multiple coherence time intervals. The user device has a predetermined probability of being transmitted to during each of the multiple coherence time intervals. This predetermined probability of being transmitted to during each of the multiple coherence time intervals is used to decode the received signaling. An article of manufacture is also provided, the article comprising a processor-readable storage medium storing one or more software programs which when executed by one or more processors performs the steps of this method.

Many embodiments are provided in which this method is modified. For example, in many embodiments using the predetermined probability to decode the received signaling involves decoding the received signaling without making a hard decision regarding whether the user device was being transmitted to during each of the multiple coherence time intervals. Furthermore, in many embodiments using the predetermined probability to decode the received signaling involves utilizing an error correcting decoder to decode the received signaling.

A transceiver node apparatus is also provided. The transceiver node being configured to communicate with other devices of a system and being operative to select a transmit group to which to transmit during a first coherence time interval, wherein the transmit group is selected from a plurality of users for which there is data to transmit during the first coherence time interval, being operative to transmit the data associated with users in the transmit group to the transmit group during the first coherence time interval, and being operative to select subsequent transmit groups to which to transmit during subsequent coherence time intervals, wherein a user of the plurality of users is selected for transmission over the course of the first coherence time interval and the subsequent coherence time intervals with a predetermined probability. Many embodiments are provided in which this transceiver node is modified. Examples of such embodiments can be found described above with respect to the first method.

A user device apparatus is also provided. The user device being configured to communicate with other devices of a system and being operative to receive signaling from a transceiver node during multiple coherence time intervals, wherein the user device has a predetermined probability of being transmitted to during each of the multiple coherence time intervals, and being operative to use the predetermined probability of being transmitted to during each of the multiple coherence time intervals to decode the received signaling. Many embodiments are provided in which this user device is modified. Examples of such embodiments can be found described above with respect to the second method.

DETAILED DESCRIPTION OF EMBODIMENTS

To provide a greater degree of detail in making and using various aspects of the present invention, a description of our approach to data transmission with user selection and a description of certain, quite specific, embodiments follows for the sake of example.

Let us consider the communication scenario again in more detail. The BS is equipped with M antennas. The channel between the BS station and say the r-th user is a vector $h_r=(h_1, \ldots, h_M)$. A signal that is transmitted by the j-th antenna of BS is multiplied by $h_j$.

A typical user selection scheme is organized as follows. There are K users that send K orthogonal pilots to the BS. The BS station uses these orthogonal pilots to estimate the channels vectors $h_1, \ldots, h_K$. Next the BS chooses L≤K users whose channel vectors $h_{i_1}, \ldots, h_{i_L}$ have the largest magnitude, that is $\|h_{i_1}\|, \ldots, \|h_{i_L}\|$ are larger than $\|h_r\|$ of any other user. (Here $\|h_r\|$ is the magnitude of the vector $h_r$.) Note that, other criteria could be used for choosing L of K users. Next, the BS station transmits to those selected users up to the end of the coherence interval. In the beginning of the next coherence interval the entire process starts over. By transmitting to users with good channel vectors the BS maximizes the system throughput.

As we mentioned previously, the problem is that the channel vectors $h_1, \ldots, h_K$ stay constant only during one coherence interval, which is a very short period of time (typically half a millisecond). So it is unclear how the BS can inform the users as to which of them were selected for transmission during the given coherence interval. Sending this information explicitly may require nearly the entire coherence interval.

Therefore, we propose to modify the user selection scheme in such a way that over a long period of time (that includes many coherence intervals) each user would be selected with a predetermined probability. So the r-th user will be selected with probability $p_r$. For example, we may send to all users with equal probabilities 1/K, during a sequence of N consecutive coherence intervals. (This carries the implication that if the r-th user was not selected for sufficiently many coherence intervals the BS would eventually select it, even if its channel vector continued to be bad, that is $\|h_r\|$ continued to be small.)

We do not send to users any dedicated signals indicating which of them were selected in a given coherence interval. Instead, we propose the following. Let us assume that symbols $q_1^{(1)}, q_2^{(1)}, q_3^{(1)}, \ldots$ should be transmitted by the BS to the 1-st user, symbols $q_1^{(2)}, q_2^{(2)}, q_3^{(2)}, \ldots$ should be transmitted to the 2-nd user and so on (the upper index denotes the user index). Note that the symbols $q_j^{(r)}$ typically belong to a signal modulation constellation $S=\{s_1, \ldots, s_m\}$. For instance, S could be m-QAM modulation.

Let us consider the 1-st coherence interval. If the r-th user was selected by the BS at this coherence interval, the BS transmits $q_1^{(r)}$ to the r-th user. If the r-th user was not selected for this interval the BS throws away $q_1^{(r)}$ and does not transmit to the r-th user at all.

Let us now consider the 2-nd coherence interval. Assume that the r-th user was selected by the BS. Then the BS transmits to the r-th user symbol $q_2^{(r)}$, independent of whether or not this user was selected for the 1-st coherence interval. So, if the r-th user is not selected for the 1-st coherence interval, the BS does not transmit to the user the symbol $q_1^{(r)}$. The symbol $q_1^{(r)}$ is discarded. If the r-th user was not selected by the BS for the 2-nd coherence interval. Then the BS discards $q_2^{(r)}$ and does not transmit it to this user at all.

In general, if the r-th user is selected for the t-th coherence interval, the BS transmits to the user the symbol $q_1^{(r)}$ independent of the history of selections/non-selections of the r-th user for previous coherence intervals. If the r-th user is not selected for the t-th coherence interval, the BS can discard the symbol $q_1^{(r)}$ since it will not be transmitted to the r-th user after the t-th coherence interval.

From the r-th user point of view, it receives information via the following communication channel $$x_r = D_r \|h_r\| q_r + \text{interference from other users} + \text{additive noise} \quad (1)$$

where $D_r=1$ if the user was selected, and $D_r=0$ if it was not selected. This channel is a special kind of fading channel.

Since we impose the requirement 1, we will have that the probability $Pr(D_r=1)=p_r$ is known to the r-th user. So we suggest that the data for the r-th user be protected by an error correcting code V that allows reliable information transmission over the communication channel (1) with a data rate close to the capacity C of the channel (1). For instance, an LDPC code with this property can be constructed with the help of the EXIT charts technique described in S. ten Brink, G. Kramer, A. Ashikhmin, "Design of low-density parity-check codes for modulation and detection," IEEE Transactions on Communications, vol. 52, no. 4, 2004, pp. 670-678.

We further suggest that each user not make a hard decision on whether it was selected or not by the BS in any particular coherence interval. Instead, we propose that the r-th user, using the known probability $p_r$ and the received symbol $x_r$, compute the probabilities $$Pr(D_r=0|x_r), Pr(q_r=s_1, D_r=1|x_r), \ldots, Pr(q_r=s_m, D_r=1|x_r)$$

and pass these probabilities to a decoder of the code V. In particular, if V is an LDPC code, one may use belief propagation decoding.

This approach can be shown to be highly efficient. Let us assume that there is a genie who informs each of K users whether it was selected or not in each coherence interval. Denote by C_genie the capacity of such channel. It can be rigorously proven that the capacity of the communication channel (1), say C, satisfies C>C_genie-1. So we lose at most only one data bit! In reality, our C will be even greater.

It is not a difficult problem to construct an LDPC or TURBO code that would allow reliable information transmission via the channel (1) with a rate R close to C_genie. Thus, the overall data rate R will be close to C_genie. Thus, our approach can provide a significant improvement of data transmission rates in wireless MIMO systems.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 2:
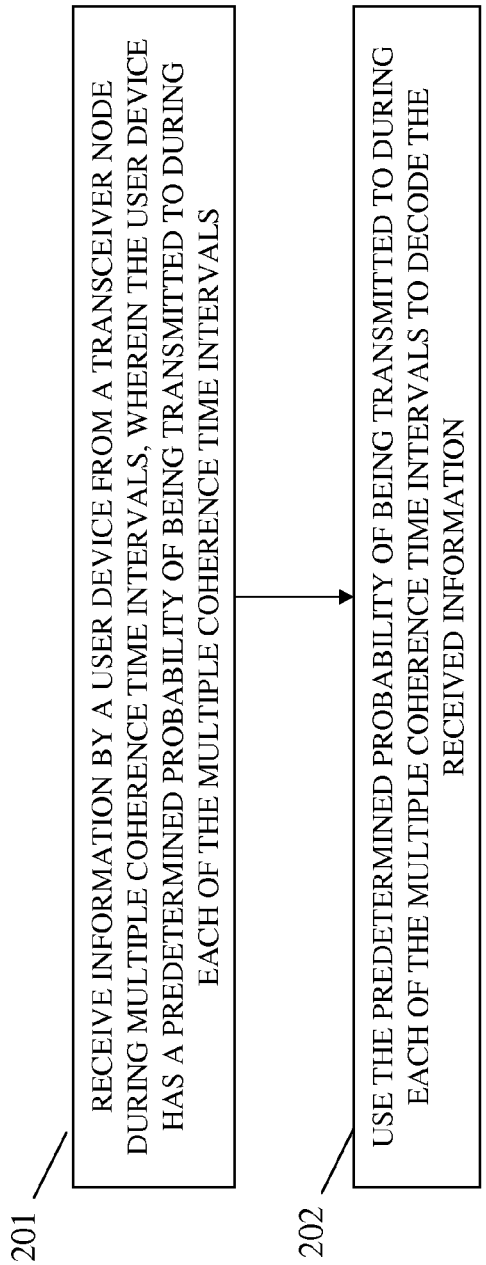
FIG. 2 is a logic flow diagram of functionality performed by a user device in accordance with various embodiments of the present invention.

Aspects of embodiments of the present invention can be understood with reference to FIGS. 1-2. Diagram 100 of FIG. 1 is a logic flow diagram of functionality performed in accordance with various embodiments of the present invention. In the method depicted in diagram 100, a transmit group to which to transmit during a first coherence time interval is selected (101). The transmit group is selected from a plurality of users for which there is data to transmit during the first coherence time interval. The data associated with users in the transmit group is transmitted (102) to the transmit group during the first coherence time interval. Subsequent transmit groups to which to transmit during subsequent coherence time intervals are also selected (103). A user of the plurality of users is selected for transmission over the course of the first coherence time interval and the subsequent coherence time intervals with a predetermined probability.

Many embodiments are provided herein in which the method and logic flow above may be modified. For example, as described in block 102, in many embodiments transmitting the data associated with users in the transmit group during the first coherence time interval includes transmitting the data without indicating to the plurality of users which users are in the transmit group. In many embodiments, transmitting the data associated with users in the transmit group during the first coherence time interval includes transmitting at least one symbol to each user in the transmit group during the first coherence time interval. Also many embodiments include discarding the data associated with users not in the transmit group. This is data that was available for transmission during the first coherence time interval but was intended for users that were not selected for transmission. Many embodiments may also include utilizing error correcting coding to protect data to be transmitted to the plurality of users. Using error correcting coding often further involves using the predetermined probability of selecting the user for transmission to protect data to be transmitted to the user.

Diagram 200 of FIG. 2 is a logic flow diagram of functionality performed by a user device in accordance with various embodiments of the present invention. In the method depicted in diagram 200, a user device receives (201) signaling from a transceiver node during multiple coherence time intervals. The user device has a predetermined probability of being transmitted to during each of the multiple coherence time intervals. This predetermined probability of being transmitted to during each of the multiple coherence time intervals is used (202) to decode the received signaling.

Many embodiments are provided herein in which the method and logic flow above may be modified. For example, in many embodiments using the predetermined probability to decode the received signaling involves decoding the received signaling without making a hard decision regarding whether the user device was being transmitted to during each of the multiple coherence time intervals. Furthermore, in many embodiments using the predetermined probability to decode the received signaling involves utilizing an error correcting decoder to decode the received signaling.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method comprising:
    selecting a transmit group to which to transmit during a first coherence time interval, wherein the transmit group is selected from a plurality of users for which there is data to transmit during the first coherence time interval;
    transmitting the data associated with users in the transmit group to the transmit group during the first coherence time interval;
    selecting subsequent transmit groups to which to transmit during subsequent coherence time intervals, wherein a user of the plurality of users is selected for transmission over the course of the first coherence time interval and the subsequent coherence time intervals with a predetermined probability, wherein the predetermined probability is a probability of the user being randomly selected for data transmission, and wherein the predetermined probability is independent of and not influenced by a probability of successful data reception by the user; and
    using an error correcting code to protect data to be transmitted to the user of the plurality of users, wherein the error correcting code is configured to enable the user to recover the data from the transmission over the course of the first coherence time interval and the subsequent coherence time intervals in which the user is selected to be in the transmit groups with the predetermined probability.

2. The method as recited in claim 1, wherein transmitting the data associated with users in the transmit group to the transmit group during the first coherence time interval comprises:
    transmitting the data without indicating to the plurality of users which users are in the transmit group.

3. The method as recited in claim 1, wherein transmitting the data associated with users in the transmit group to the transmit group during the first coherence time interval comprises:
    transmitting at least one symbol to each user in the transmit group during the first coherence time interval.

4. An article of manufacture comprising a processor-readable storage medium storing one or more software programs which when executed by one or more processors performs the steps of the method of claim 1.

5. The method as recited in claim 1, wherein the error correcting code is a low-density parity-check (LDPC) code.

6. The method as recited in claim 1, wherein, for at least one coherence time interval of the first coherence time interval and the subsequent coherence time intervals, the user of the plurality of users is not selected for the transmission, with data being available to transmit to the user during said at least one coherence time interval.

7. The method as recited in claim 6, further comprising:
    discarding the data available to transmit to the user during said at least one coherence time interval.

8. A method comprising:
    receiving signaling by a user device from a transceiver node during multiple coherence time intervals, wherein the user device has a predetermined probability of being transmitted to during each of the multiple coherence time intervals, wherein the predetermined probability is a probability of data for the user device being randomly selected for transmission to the user device, and wherein the predetermined probability is independent of and not influenced by a probability of successful data reception by the user device;
    using an error correcting code to recover data transmitted to the user device, wherein the error correcting code is configured to enable the user device to recover the data from the signaling received during the multiple coherence time intervals in which the user device is selected to be transmitted to with the predetermined probability.

9. The method as recited in claim 8, wherein said using the error correcting code comprises
    decoding the received signaling without making a hard decision regarding whether the user device was being transmitted to during each of the multiple coherence time intervals.

10. An article of manufacture comprising a processor-readable storage medium storing one or more software programs which when executed by one or more processors performs the steps of the method of claim 8.

11. The method as recited in claim 8, wherein the error correcting code is a low-density parity-check (LDPC) code.

12. A transceiver node of a communication system, the transceiver node being configured to communicate with other devices in the system, wherein the transceiver node is operative
    to select a transmit group to which to transmit during a first coherence time interval, wherein the transmit group is selected from a plurality of users for which there is data to transmit during the first coherence time interval,
    to transmit the data associated with users in the transmit group to the transmit group during the first coherence time interval, and
    to select subsequent transmit groups to which to transmit during subsequent coherence time intervals, wherein a user of the plurality of users is selected for transmission over the course of the first coherence time interval and the subsequent coherence time intervals with a predetermined probability, wherein the predetermined probability is a probability of the user being randomly selected for data transmission, and wherein the predetermined probability is independent of and not influenced by a probability of successful data reception by the user, and
    to use an error correcting code to protect data to be transmitted to the user of the plurality of users, wherein the error correcting code is configured to enable the user to recover the data from the transmission over the course of the first coherence time interval and the subsequent coherence time intervals, in which the user is selected to be in the transmit groups with the predetermined probability.

13. The transceiver node as recited in claim 12, wherein being operative to transmit the data associated with users in the transmit group to the transmit group during the first coherence time interval comprises:
    being operative to transmit the data without indicating to the plurality of users which users are in the transmit group.

14. The transceiver node as recited in claim 12, wherein being operative to transmit the data associated with users in the transmit group to the transmit group during the first coherence time interval comprises:
    being operative to transmit at least one symbol to each user in the transmit group during the first coherence time interval.

15. The transceiver node as recited in claim 12, further comprising:
being operative to discard the data associated with users not in the transmit group but for transmission during the first coherence time interval.

16. The transceiver node as recited in claim 12, wherein the error correcting code is a low-density parity-check (LDPC) code.

17. A user device of a communication system, the user device being configured to communicate with other devices in the system, wherein the user device is operative
to receive signaling from a transceiver node during multiple coherence time intervals, wherein the user device has a predetermined probability of being transmitted to during each of the multiple coherence time intervals, wherein the predetermined probability is a probability of data for the user device being randomly selected for transmission to the user device, and wherein the predetermined probability is independent of and not influenced by a probability of successful data reception by the user device, and
to use an error correcting code to recover data transmitted to the user device, wherein the error correcting code is configured to enable the user device to recover the data from the signaling received during the multiple coherence time intervals in which the user device is selected to be transmitted to with the predetermined probability.

18. The user device as recited in claim 17, wherein said being operative to use the error correcting code comprises
being operative to decode the received signaling without making a hard decision regarding whether the user device was being transmitted to during each of the multiple coherence time intervals.

19. The user device as recited in claim 17, wherein the error correcting code is a low-density parity-check (LDPC) code.

* * * * *